Nov. 8, 1966  N. GANIARIS  3,283,522
FREEZE CONCENTRATION
Filed Nov. 4, 1963  2 Sheets-Sheet 1

INVENTOR:
NEOPHYTOS GANIARIS

Nov. 8, 1966 N. GANIARIS 3,283,522
FREEZE CONCENTRATION
Filed Nov. 4, 1963 2 Sheets-Sheet 2

INVENTOR:
NEOPHYTOS GANIARIS

United States Patent Office 3,283,522
Patented Nov. 8, 1966

3,283,522
FREEZE CONCENTRATION
Neophytos Ganiaris, New York, N.Y., assignor to Struthers Scientific and International Corporation, New York, N.Y., a corporation of Delaware
Filed Nov. 4, 1963, Ser. No. 321,020
9 Claims. (Cl. 62—58)

This invention relates in general to the separation of solutes and solvents from each other, and, more particularly, to the concentration of solutions by freeze concentration.

In the freeze concentration of aqueous comestibles, such as coffee, tea, citrus juices, beer, wine, comestible extracts in aqueous solutions and/or slurries, and the like, the material to be concentrated is cooled until ice crystals form. The ice crystals form in a solution of the material to be concentrated and are then removed from it by any suitable device such as a centrifuge. No matter how the ice crystals are removed from the solution, some of the solution adheres to the surface of the crystals and must be washed from them.

The larger the ice crystals that can be formed in solution, the easier it will be to wash them, as the total surface area of a given weight of crystals to which a solution may adhere will be less for large crystals than for small crystals.

In the process of continuous freeze concentration of comestibles, the solution to be concentrated may pass through several cycles or steps, becoming progressively more concentrated, until a desired degree of concentration is reached. As ice crystals form in progressively more concentrated solutions, the more concentrated solutions are more viscous and thus much harder to wash from the crystals. As the crystals become harder to wash, a greater amount of the crystals is lost through partial melting during the washing. This crystal loss reduces the efficiency of the process.

It is, therefore, an object of this invention to provide a continuous process for the freeze concentration of a comestible or other solution in which the crystal loss during the necessary washing of the crystals is minimized.

Another object of this invention is to provide a continuous process for the freeze concentration of solutions in which the loss of valuable solutes with the removal of the solution is minimized.

A further object of this invention is to provide, for a continuous process for the freeze concentration of comestibles or the like in solution, a system of apparatus comprising a number of stages each having a crystallizer to freeze ice crystals out of solution and means to remove the crystals from the resulting more concentrated solution; the comestibles or the like in solution passing through the stages in succession to become increasingly more concentrated; the ice crystals from at least one or more later stages being mixed with some incoming solution and then being returned as a slurry to be mixed with the feed of an earlier crystallizer.

An additional object of this invention is to provide a more efficient and less costly freeze concentration process.

Yet another object of this invention is to effect the freeze concentration of solutions by the growth of crystals which are nucleated in a concentrated slurry and further grown in a less concentrated slurry from which the resulting crystals are washed free from solution.

Still another object of this invention is to avoid the formation of an ice crust during the washing of crystals formed during the freeze concentration of a solution.

Many other objects, advantages and features of invention reside in the particular sequence of steps involved in the process of this invention as will be understood from the following description and accompanying drawing wherein.

Figure 1:
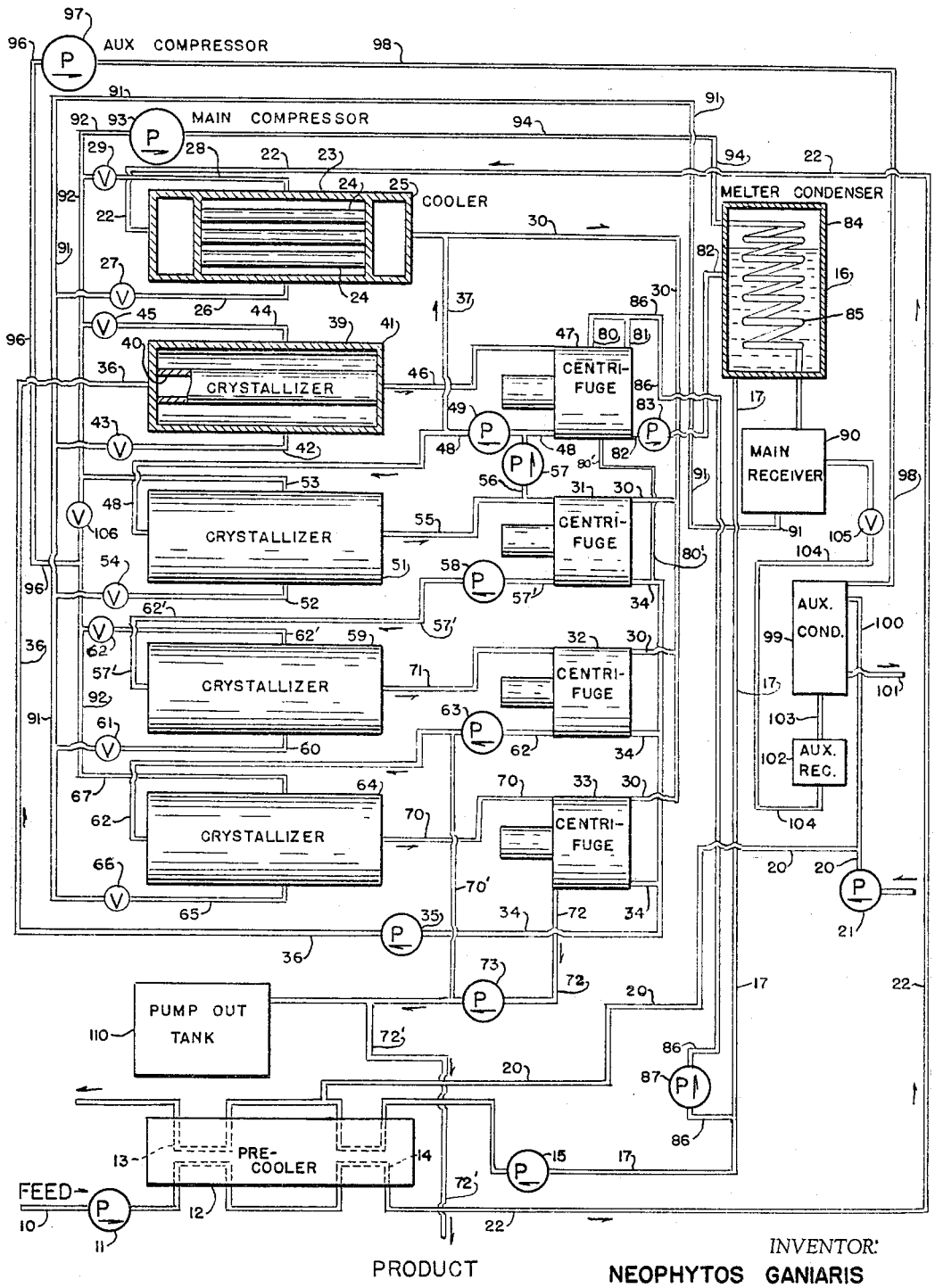
FIGURE 1 is a diagrammatic elevation of apparatus required to carry out a process which provides an example of this invention.

Referring to the drawing in detail and FIGURE 1 in particular, a feed of liquid to be concentrated (in this example a 10% solution of coffee at 120° F.) is drawn through pipe 10 by pump 11 and passed through the pre-cooler 12 having sets of heat exchanger plates, tubes, or the like 13 and 14. Feed liquid passing through plates 13 and 14 is cooled from 120° F. to 50° F. The heat exchanger plates 14 are cooled by water at a temperature of 35° F. which is pumped by pump 15 through pipe 17 from the melter condenser 16 which will later be described. This water, now raised above 35° F. in passing through the plates 14, is mixed with cooling water at ambient temperature of about 75° F. Pump 21 delivers the cooling water at ambient temperature through pipe 20 to be mixed with the cooling water flowing from plates 14. This mixture flows to the plates 13 for the initial cooling of the feed solution.

The feed solution, now cooled to 50° F. in passing through the pre-cooler, passes through pipe 22 to enter the feed cooler 23. Cooler 23 contains the tubes 24 within a shell 25. Tubes 24 are cooled by the vaporizing or flashing of liquid ammonia entering shell 25 through pipe 26 with its flow being controlled by valve 27. Vaporized ammonia leaves shell 25 through pipe 28 regulated by valve 29. The feed liquid (in this example a 10% solution of roasted coffee bean extract in water) leaves cooler 23 through pipe 30, cooled to 35° F. Valves 27 and 29 may be used to control the temperature of coffee extract leaving cooler 23. In the practice of this invention, any other suitable refrigerant may be used in place of ammonia and any equivalent cooler may be substituted for the coolers 12 and 23.

In pipe 30 some feed solution destined for crystallizer 51, which will later be described, is blended with the cooled 35° F. feed solution by means of pipe 37 which leads into pipe 30. From pipe 30 the coffee extract, now a 13.4% solution by weight of coffee solids, is fed in parallel to three centrifuges 31, 32 and 33 where it is used to reslurry ice separated by these centrifuges.

The coffee solution and ice slurry from these centrifuges is collected by pipes 34 and pumped by pump 35 through pipe 36 to crystallizer 39. Crystallizer 39, in a simple form, may consist of at least a single tube 40 in a shell 41. A liquid refrigerant, in this example ammonia, enters shell 41 through pipe 42 controlled by valve 43. The flashing of refrigerant to vapor in shell 41 cools tube 40 to cause ice crystals to form and grow in the coffee solution and ice crystal slurry passing through it. Refrigerant vapor leaves shell 41 through pipe 44 controlled by valve 45.

Control of the ice crystal growth and formation in crystallizer 39 may be accomplished by the regulation of valve 43. If desired, this valve may be automatically set in response to temperature sensing devices (not shown) in pipe 46 which conducts the ice crystals and coffee extract slurry from crystallizer 39 to centrifuge 47.

Centrifuge 47 separates ice crystals from the coffee solution which is now concentrated to 16%. The coffee solution so separated passes from centrifuge 47 through pipe 48 diven by pump 49. A portion of this 16% solution may be returned or recycled to pipe 30 by means of pipe 37 in the manner which has been described. The remainder of this 16% solution enters crystallizer 51, which is substantially the same as crystallizer 39, with liquid refrigerant entering it through pipe 52 and vapor leaving it through pipe 53. The refrigerant flow and flashing in crystallizer 51 is controlled by a valve 54 to concentrate the coffee solution to 25%.

The slurry of 25% coffee solution in ice crystals passes to centrifuge 31 through pipe 55. In some cases, crystal growth will be promoted in both crystallizers 39 and 51 if some of the slurry from crystallizer 51 is introduced into pipe 48 in front of pipe 37 by means of a pump 57 and pipes 56.

In centrifuge 31 the 25% solution is separated from the ice crystals, which solution passes through pipes 57' driven by pump 58 to crystallizer 59. Crystallizer 59 is cooled by a liquid refrigerant entering through pipe 60 controlled by valve 61 and leaving, as a vapor after flashing, through pipe 62' and valve 62. Crystallizer 59 concentrates the coffee solution to 37% to pass from it through pipe 71 as an ice slurry to centrifuge 32.

Again in centrifuge 32 ice crystals are separated from the coffee solution which is now concentrated to 37%. This solution passes through pipes 62 driven by pump 63 to the last crystallizer 64. Crystallizer 64 is cooled by liquid refrigerant entering through pipes 65 controlled by valve 66 and leaving, as a vapor, through pipe 67. Crystallizer 64 concentrates the coffee solution to 46% to pass through pipe 70 as an ice slurry to the final centrifuge 33.

In centrifuge 33 the coffee solution, now finally concentrated to 46%, is separated from the ice crystals and drawn off through pipe 72 by pump 73 to be delivered as a final product through pipe 72'. If desired some of the final product may be recycled through pipe 70' to crystallizer 64.

As has been described, the ice crystals separated out by the centrifuges 31, 32, and 33 are washed and made into an ice slurry with the relatively weak concentration of 13.4% coffee solution. Ice crystals separated out of the 16% solution in centrifuge 47 are first washed by water entering through pipe 80 and then mixed with water entering through pipe 81 to make a slurry of water and ice which is drawn through pipe 82 by pump 83 and passed to the melter condenser 16.

Figure 2:
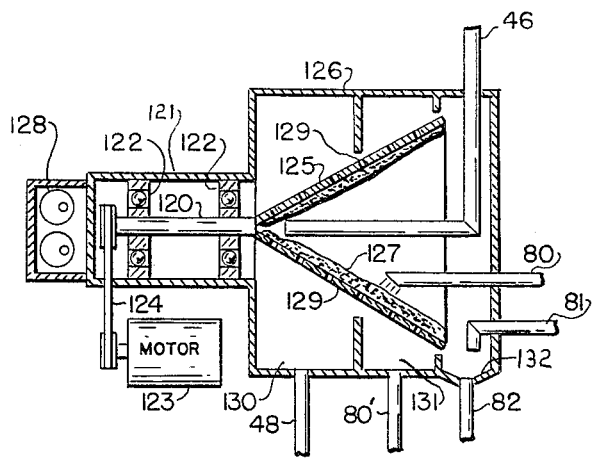
FIGURE 2 is a vertical section through a centrifuge which may be used in the practice of this invention.

Centrifuge 47 may be as shown in FIGURE 2, or any equivalent apparatus may be used. A shaft 120 is rotatably mounted in a housing 121 by means of suitable bearings 122. Shaft 120 is driven by motor 123 by any suitable drive means 124 such as belts and pulleys. A perforated conical basket 125 is fixed to one end of shaft 120 to rotate within a collecting housing 126. The coffee extract and ice slurry feed tube 46 leads to the end of basket 125 where it discharges the slurry, indicated by the numeral 127, onto the rotating basket. A motor driven vibrator 128 causes the slurry 127 to slide along the basket as liquid extract is centrifuged from it to pass through the small openings 129 in the basket. The extract spun from the basket 125 is collected in the first compartment 130 of housing 126 and is drawn from compartment 130 through pipe 48. Wash water from pipe 80 sprays on the ice crystals on the basket and the wash water is then collected in the second compartment 131 to be drawn off through pipe 80' as shown in FIGURE 1.

Washed ice crystals fall from basket 125 into the endmost compartment 132 of the centrifuge to be slurried with water from pipe 81 and drawn off as a water ice slurry through pipe 82. The centrifuges 31, 32 and 33 may be identical to centrifuge 47 except that wash water is not introduced and a separate compartment is not provided to collect it.

Referring again to FIGURE 1, the melter condenser 16, into which the slurry of ice and water is introduced by pipe 82, is a tank 84 containing a coil 85, or other heat exchanger, in which refrigerant is condensed to give up heat and melt the ice. Water from melter condenser 16 flows out through pipe 17 from which the largest part is drawn through pipe 86 by pump 87 to be returned to centrifuge 47 through pipes 80 and 81 for the purpose which has been described. The water level in the melter condenser 16 is controlled by the amount of water pumped by pump 15 through pre-cooler 12.

A liquid refrigerant reservoir 90 receives liquid refrigerant from the condensing coil 85 of the melter condenser. This liquid refrigerant passes into the cooler 23 and the crystallizers 39, 51, 59 and 64 by means of pipe 91 and pipes 26, 42, 52, 60 and 65, respectively. The vaporized refrigerant from the cooler 23 and the crystallizers 39, 51, 59 and 64 passes through pipes 28, 44, 53, 62' and 67, respectively, to pipe 92 which conducts it to compressor 93 where the vapor is compressed and passed through pipe 94 to melter condenser 16 where it is cooled and condensed to a liquid.

Pipe 96 is arranged to draw refrigerant vapor from pipes 62' and 67 to bypass compressor 93 and the melter condenser 16. Vapor from pipe 96 is compressed by the auxiliary compressor 97 to pass through pipe 98 to the auxiliary condenser 99 which is cooled by cooling water at ambient temperature from pipe 20 which is led off in pipe 100 from pump 21. Cooling water passes out of condenser 99 through pipe 101. The condensed refrigerant passes to an auxiliary receiver 102 through a pipe 103 and flows from it through pipe 104 to enter the main receiver of liquid refrigerant reservoir 90.

The vapor from the feed cooler 23 and the crystallizers 39 and 51 may be combined to flow to the main compressor 93 as a low pressure refrigeration cycle. The vapor from crystallizers 59 and 64 combines to flow to the auxiliary compressor 97 as a high pressure refrigeration cycle. Valve 105 in pipe 104 is an expansion valve which controls the flow of refrigerant from the auxiliary to the main refrigeration cycle. Valve 106 in pipe 92 is also an expansion type valve which controls flows of refrigerant from the main to the auxiliary refrigeration system.

Since the amount of ice water available in the melter condenser 16 is, when the process is operating under steady state conditions, a fixed quantity and cannot be increased, it is obvious that ice as a cooling medium will be insufficient to condense all the refrigerant vapors passing through the melter condenser. This will cause an increase in the pressure in the low pressure refrigeration cycle.

To prevent such an increase in the low pressure refrigeration cycle and the melter condenser, an automatic bleed system (not shown) may be provided between the low and high pressure refrigeration cycles. This bleed system is controlled so that, as the pressure in the melter condenser 16 increases, refrigerant vapor may flow from the low pressure to the high pressure system. This additional load on the auxiliary compressor 97 will require that auxiliary condenser 99 have a higher capacity which is provided by an increase in the cooling water flow rate through pipes 100 and 101.

The refrigeration system herein described minimizes compressor power requirements and maximizes heat recovery from the ice being produced.

As further illustrating the example which has been given of the practice of this invention, coffee extract was concentrated in the manner hereinbefore described with the following values. The temperature of the coffee extract leaving cooler 23 was 35° F. and leaving the crystallizers 39, 51, 59 and 64 was 30.5° F., 29° F., 26.4° F. and 23.4° F., respectively.

Using ammonia as a refrigerant, vapor entered auxiliary compressor 97 at 40 p.s.i.a. and left at 205 p.s.i.a. Vapor entered compressor 93 at 47 p.s.i.a. and left at 75 p.s.i.a. Liquid ammonia vaporized to 62 p.s.i.a. in the cooler 39, to 48 p.s.i.a. in crystallizer 39, to 47 p.s.i.a. in crystallizer 51, to 44 p.s.i.a. in crystallizer 59, and to 41 p.s.i.a. in crystallizer 64. Condensed liquid ammonia left melter condenser 16 at 41° F. and the auxiliary condenser 99 at 97° F.

In the continuous process freeze concentration of coffee solution prior to this invention, ice crystals removed from a 46% coffee solution in a centrifuge 33 would have had to be washed, preferably with cold water. Crystals separated from a 46% coffee solution may have up to 40% of the weight of the crystals of coffee solution adhering to them. Since this adhering solution must be washed from the crystals as the coffee extract or solute is the desired and valuable end product, the crystals must be very thoroughly washed if they are extracted from a relatively concentrated 46% solution.

However, in the practice of this invention, the ice crystals which are washed and removed in centrifuge 47 are washed from a 16% coffee solution. Since ice crystals in a 16% solution of coffee extract will only have about 4% by weight of the crystals of the less viscous coffee solution adhere to them, they are much more easily washed and the resulting loss of coffee in the entire process is less than 1%. In this invention the crystals which are separated from more viscous solutions in centrifuges 31, 32 and 33 are not necessarily washed but they are mixed with the incoming feed from pipe 30 and recycled through crystallizer 39. Thus, in the foregoing example, the product is removed at the end of a series of stages of concentration while ice separated out in later stages is mixed with incoming feed solution and passed through a first crystallizer from which ice is removed from solution.

Another advantage enjoyed by this invention is the avoidance of problems associated with the high viscosity of the higher concentrations of solution which inhibit the growth of crystals. This advantage is obtained by recycling the crystals from the last three crystallizers 51, 59 and 64 into the first crystallizer 39, so that larger and more uniform crystals may be grown to be more effectively washed and removed from the system. This results from the fact that a lower temperature is required to form ice crystals from a more concentrated solution. Thus ice crystals are formed in crystallizer 39 at 30.5° F. while they are formed in crystallizer 64 at 23.4° F. If the colder crystals emerging from crystallizer 64 were washed, they would tend to cool the wash water contacting them below freezing to form an ice crust and include some of the valuable coffee extract in the resulting crust. The crust prevents the further penetration of the wash water and the effective washing of the crystals. However, when the crystals at 30.5° F. are washed, they do not freeze water about them to form an ice crust. Thus this invention permits the more efficient washing of much larger crystals than was heretofore possible as crystals at their largest state of growth are washed with water at the highest possible temperature with the least amount of coffee being lost.

Figure 3:
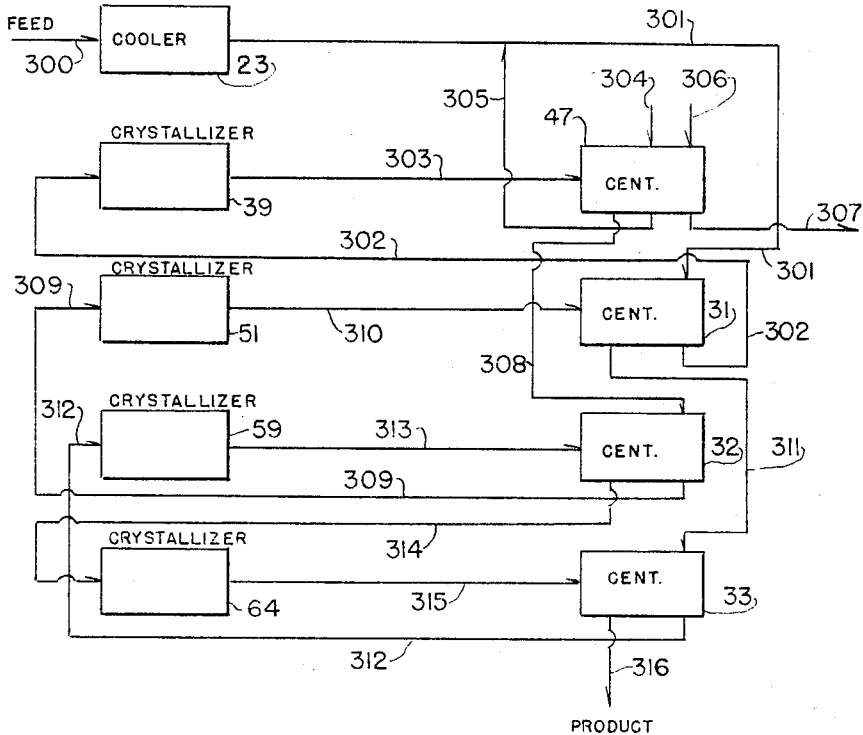
FIGURE 3 is a diagram of a modification of this invention.

FIGURE 3 shows a modification of this invention having a cooler 23, four crystallizers 39, 51, 59 and 64, and four centrifuges 47, 31, 32 and 33 all of which are substantially identical to those shown in FIGURE 1. Arrow 300 designates the flow of feed, in this example a 10% coffee solution. As indicated by line 301, the cooled coffee solution flows to centrifuge 31 to slurry ice crystals separated out in this centrifuge. Line 302 indicates the flow of the slurried ice crystals from centrifuge 31 to crystallizer 39. The solution of coffee and ice crystals leaving crystallizer 39 is concentrated to 16% and passes to centrifuge 47 as shown by line 303.

In centrifuge 47, wash water enters as indicated by arrow 304 to wash the crystals separated from the solution. This crystal washing or rinsing water follows the path indicated by line 305 to be recycled into the feed leaving cooler 23. Water enters at arrow 306 from a melter condenser (not shown) or any other source to form a water and ice slurry which passes from the system as shown by arrow 307.

The 16% solution of coffee extract passes along line 308 from centrifuge 47 to centrifuge 32 to slurry ice crystals separated in that centrifuge. This slurry of ice crystals and 16% coffee solution follows line 309 to crystallizer 51. Flow from crystallizer 51, now concentrated to 25%, follows along line 310 to centrifuge 31. The 25% solution separated in centrifuge 31 flows, as indicated by arrow 311, to centrifuge 33 to slurry ice crystals separated in it. The 25% solution and the ice crystals pass to crystallizer 59 along line 312.

The coffee solution flowing along line 313 to centrifuge 32 is now concentrated to 37%. This 37% solution is separated out and follows line 314 to crystallizer 64 from which it passes along arrow 315 to centrifuge 33. In centrifuge 33 the coffee solution, now concentrated to 47%, is separated from the ice crystals and emerges, as indicated by arrow 316, as a final product.

This modification of the process of this invention makes possible the growth of larger crystals as each crystal passes through all the crystallizers. The final crystals pass from crystallizer 39 to centrifuge 47 where the larger crystals are more efficiently washed and removed from the system with less loss of valuable coffee extract.

The washing of a dilute coffee solution from crystals, which in this invention are at their highest temperature and largest size leaving the first crystallizer 39, is more efficient because the large crystals at higher temperature will not form an ice crust to include valuable coffee extract and prevent the penetration of the wash water.

In the practice of this invention for the concentration of coffee extract prior to being made into instant coffee, the total average dwell time of the coffee extract in the system is critical. If the coffee remains too long in the system, experience has shown that its flavor will be impaired. Thus the average time in the system must be kept below 60 minutes for best results.

Both the processes shown in FIGURES 1 and 3 provide an average dwell time in the system of less than 60 minutes. However, while the modification of the invention shown in FIGURE 3 makes possible the growth of larger crystals, this advantage may be somewhat offset by the greater energy requirements of the centrifuges when connected as shown in FIGURE 3.

While this invention has been shown and described in the best forms known, these are purely exemplary and modifications of this process may be made without departing from the spirit of the invention except as it may be more limited in the appended claims.

What is claimed is:

1. In a process of concentrating an aqueous solution by crystallization of ice, separating the ice from the solution, and recovering the solution retained on the ice by washing, the steps which comprise
    (a) cooling an aqueous solution in a plurality of crystallization steps to slurries containing ice crystals and concentrated aqueous solutions, the concentration of the aqueous solutions increasing in each succeeding crystallization step,
    (b) separating, in a plurality of ice separating steps, the ice from the slurry of each crystallization step,
    (c) passing each concentrated solution to a succeeding crystallization step,
    (d) passing back all of the ice from all succeeding ice separation steps to the first crystallization step producing a less concentrated solution, and (e) recovering, by washing, the solution from the ice separated from the first crystallization step.

2. In a process of concentrating an aqueous solution by crystallization of ice, separating the ice from the solution, and recovering the solution retained on the ice by washing, the steps which comprise;
- (a) cooling an aqueous solution in a plurality of crystallization steps to slurries containing ice crystals and concentrated aqueous solution, the concentration of the aqueous solutions increasing from the first crystallization step to each succeeding crystallization step,
- (b) separating in a plurality of ice separating steps the ice from the slurry of each crystallization step,
- (c) passing each concentrated solution from an ice separating step to a succeeding crystallization step,
- (d) passing all the ice crystals from each succeeding ice separation step to the first crystallization step producing the least concentrated solution, and
- (e) recovering, by washing, the solution from the ice separated from the first crystallization step.

3. The process according to claim 2 wherein ice separated from the slurry of each succeeding crystallization step is slurried with a dilute solution and returned to the first crystallization step.

4. In a process of concentrating an aqueous solution by crystallization of ice, separating the ice from the solution, and recovering the solution retained on the ice by washing, the steps which comprise;
- (a) cooling an aqueous solution in a plurality of crystallization steps to slurries containing ice crystals and concentrated aqueous solutions, the concentration of the aqueous solutions increasing from the first crystallization step to each succeeding crystallization step,
- (b) separating in a plurality of ice separating steps the ice from the slurry of each crystallization step,
- (c) passing concentrated solution from the ice separating steps to succeeding crystallization steps, at least one of the concentrated solutions from an ice separating step slurrying ice from a subsequent ice separating step in passing to a succeeding crystallization step,
- (d) passing all the ice crystals from all succeeding ice separation steps to the first crystallization step producing less concentrated solution, and
- (e) recovering, by washing, the solution from the ice separated from the first crystallization step.

5. In a process of concentrating an aqueous solution by crystallization of ice, separating the ice from the solution, and recovering the solution retained on the ice by washing, the steps which comprise;
- (a) cooling an aqueous solution in a plurality of crystallization steps to slurries containing ice crystals and concentrated aqueous solutions, the concentration of the aqueous solutions increasing from the first crystallization step to each succeeding crystallization step,
- (b) separating in a plurality of ice separating steps the ice from the slurry of each crystallization step,
- (c) slurrying ice separated from all crystallization steps succeeding the first crystallization step with a dilute solution,
- (d) passing the dilute solution and ice slurry through the first crystallization step,
- (e) passing the concentrated solution from at least one ice separating step to slurry ice from a succeeding ice separating step,
- (f) passing the at least one slurry of ice and concentrated solution through an earlier crystallization step, and
- (g) recovering, by washing, the solution from the ice separated from the first crystallization step.

6. Apparatus for the freeze concentration of aqueous solutions comprising, in combination,
- (a) a cooler,
- (b) means feeding a relatively dilute solution to said cooler,
- (c) a first crystallizer,
- (d) additional crystallizers,
- (e) a first means separating ice from solution,
- (f) an additional means separating ice from solution for each of said additional crystallizers, said additional means separating ice from solution including a final means separating ice from solution,
- (g) means conducting cooled feed from said cooler to at least one of said additional means separating ice from solution, the cooled feed slurrying ice from said at least one additional means separating ice from solution,
- (h) means conducting slurried ice from all additional means separating ice from solution to said first crystallizer,
- (i) means conducting ice in solution from said first crystallizer to said first means separating ice from solution,
- (j) means conducting solution from said first means separating ice from solution to one of said additional crystallizers,
- (k) means conducting ice in solution from each of said additional crystallizers to one of said additional means separating ice from solution,
- (l) means conducting solution from said additional means separating ice from solution to flow through all of said additional crystallizers,
- (m) means conducting a concentrated solution as a product from said final means separating ice from solution,
- (n) means introducing water and washing ice in said first means separating ice from solution,
- (o) means draining wash water from said first means separating ice from solution and conducting the wash water to one of said means conducting a fluid to one of said crystallizers, and
- (p) means withdrawing washed ice from said first means separating ice from solution.

7. The combination according to claim 6 wherein, in (g), said means conducting cooled feed from said cooler conducts said cooled feed to all of said additional means separating ice from solution, said cooled feed slurrying ice from all said additional means separating ice from solution; wherein, in (h), said means conducting slurried ice conducts slurried ice from all said additional means separating ice from solution to said first crystallizer; and, wherein, in (l), said means conducting solution from said additional means separating ice from solution passes said solution from each of said additional means separating ice from solution to one of said crystallizers.

8. The combination according to claim 6 wherein, in (l), said means conducting solution from said additional means separating ice from solution to flow through all of said additional crystallizers slurries ice from at least one subsequent additional means separating ice from solution while conducting the solution to said additional crystallizers.

9. The combination according to claim 6 with the addition of a melter condenser containing a refrigerant condensing coil; and a refrigeration system cooling said cooler and said crystallizers, said refrigeration system having a pump compressing refrigerant, means conducting compressed refrigerant to the condensing coil of said melter condenser, means conducting condensed refrigerant to said cooler and said crystallizers, and means conducting vaporized refrigerant from said cooler and said crystallizers to said pump; said means withdrawing washed ice from said first means separating ice from solution passing the washed ice into said melter condenser to contact said refrigerant condensing coil.

(References on following page)

References Cited by the Examiner

UNITED STATES PATENTS

| | | | |
|---|---|---|---|
| 1,931,347 | 10/1933 | Gay | 62—124 X |
| 2,666,304 | 1/1954 | Ahrel | 62—58 X |
| 2,777,888 | 1/1957 | Hoff et al. | 62—123 X |
| 3,004,397 | 10/1961 | Wenzelberger | 62—123 X |
| 3,069,864 | 12/1962 | Crosby | 62—124 X |
| 3,102,036 | 8/1963 | Smith | 99—205 X |

NORMAN YUDKOFF, *Primary Examiner.*

G. P. HINES, *Assistant Examiner.*